United States Patent [19]
McCracken

[11] 3,926,121
[45] Dec. 16, 1975

[54] TIME REMAINING UNTIL ENCOUNTER COMPUTER FOR A FUZE SYSTEM

[75] Inventor: Robert H. McCracken, Chevy Chase, Md.

[73] Assignee: The United States of America as represented by the Secretary of the Army, Washington, D.C.

[22] Filed: May 7, 1974

[21] Appl. No.: 467,769

[52] U.S. Cl. ............................ 102/70.2 P; 343/7 PF
[51] Int. Cl.² ...................... F42C 13/04; G01S 9/00
[58] Field of Search..... 102/70.2 P; 343/7 PF, 5 AG

[56] References Cited
UNITED STATES PATENTS

| | | | |
|---|---|---|---|
| 2,907,023 | 9/1959 | Skinner | 102/70.2 P |
| 3,125,026 | 3/1964 | Johnson | 102/70.2 P |

*Primary Examiner*—Charles T. Jordan
*Attorney, Agent, or Firm*—Nathan Edelberg; Robert P. Gibson; Saul Elbaum

[57] ABSTRACT

Electronic apparatus mounted on a moving projectile for determining the time remaining until the projectile encounters a target. By continuously measuring the amplitude versus time slope of a target-reflected signal and comparing it with the known range law, the apparatus predicts, outputs, and/or displays the time remaining until target encounter. A control voltage is developed from the output of a differential amplifier which uniquely represents the distance until encounter, or of the time remaining until encounter assuming constant velocity. One input to the differential amplifier is a time-delayed version of the target-reflected signal received by the projectile. The other input to the differential amplifier is an attenuated version of the target-reflected signal. Attenuation is achieved by a variable attenuator whose attenuation ratio is changed according to the control voltage, which is the output of the differential amplifier. Variations in the received signal caused by varying target aspect, vehicle attitude, flight path curvature, and the like are taken into account by a smoothing network which integrates the output of the amplifier to provide the desired output function.

3 Claims, 3 Drawing Figures

U.S. Patent Dec. 16, 1975 3,926,121
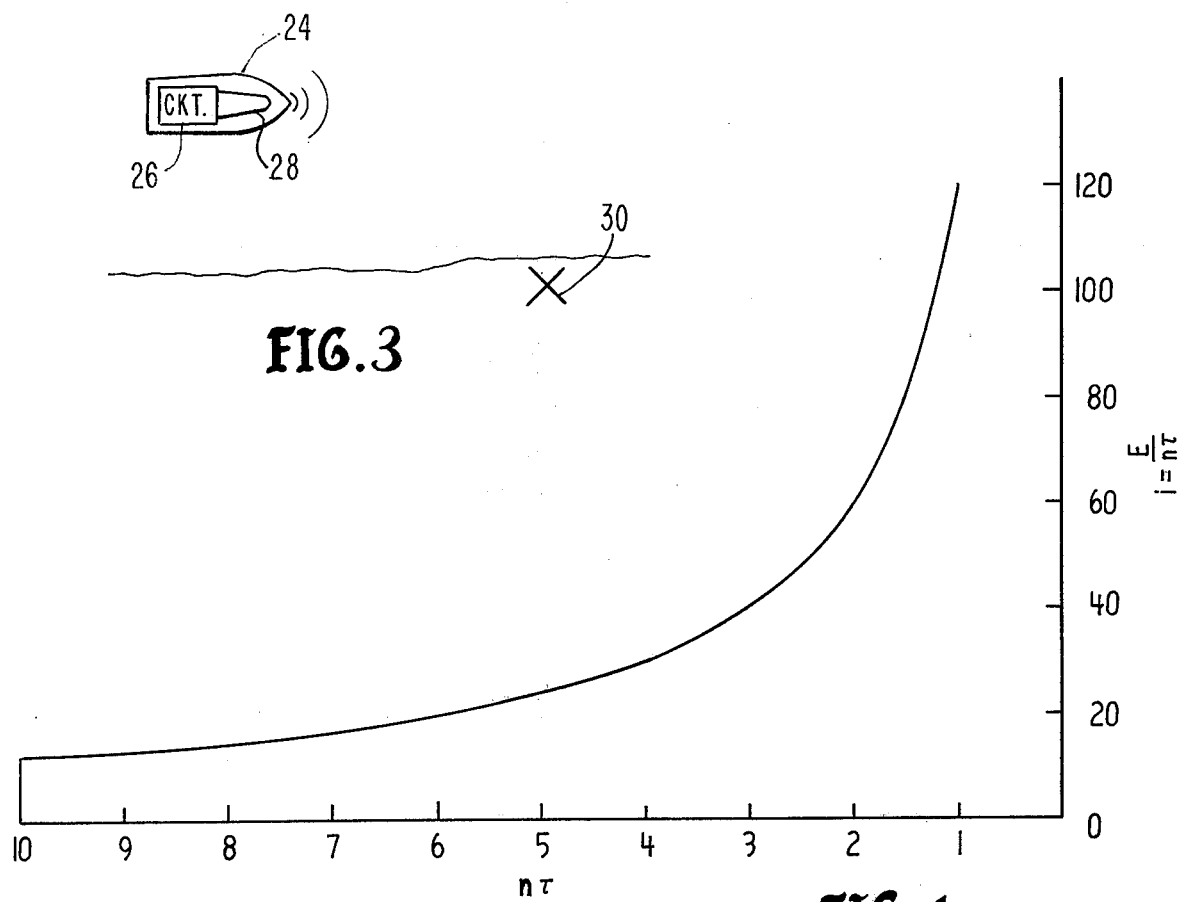
FIG. 3
FIG. 1
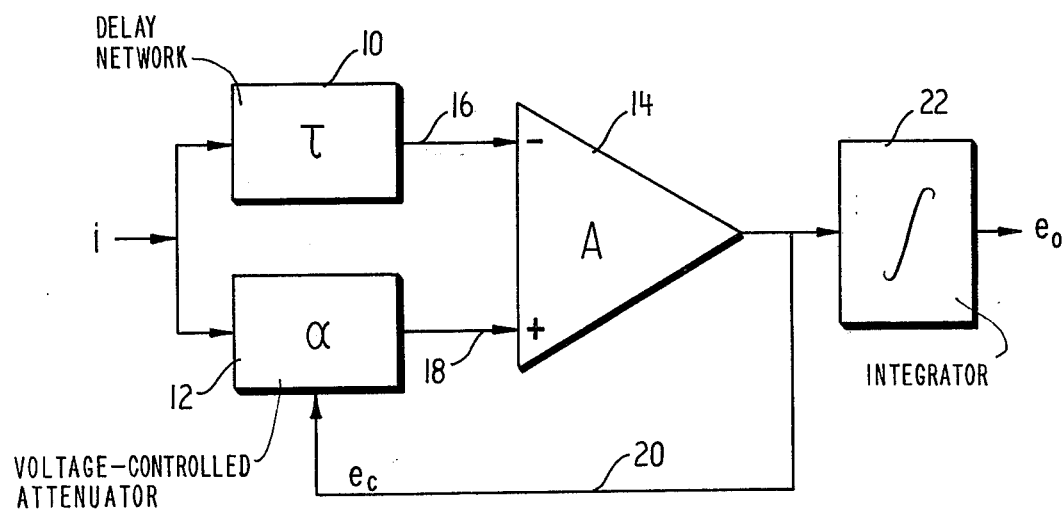
FIG. 2

TIME REMAINING UNTIL ENCOUNTER COMPUTER FOR A FUZE SYSTEM

RIGHTS OF THE GOVERNMENT

The invention described herein may be manufactured, used, and licensed by or for the United States Government for Governmental purposes without the payment to me of any royalty thereon.

BACKGROUND OF THE INVENTION

1. Field of the Invention

This invention relates to fuzing systems, and more particularly to a fuze system which produces as indication of the time remaining until target encounter.

2. Description of the Prior Art

Proximity fuze systems which direct a signal toward a target and utilize the reflected signal for various arming and firing functions are well known in the art. The classical range law teaches that the amplitude of the reflected signal increases in an inverse proportion to the distance remaining between the moving projectile and the target. Most fuzing systems presently in use utilize various amplitude sensors to detect the monotonically increasing reflected signal to trigger various safety, arming and firing functions. Since the amplitude of the return signal increases quite rapidly as the projectile nears the target, the various voltage amplitude sensing electronics must be made extremely sensitive to the rapid changes in the received signal amplitude. This is often difficult to achieve and/or requires expensive and elaborate electronics.

It is therefore apparent that it would be extremely useful to be able to provide a fuzing system responsive to the target-reflected signal which provides an indication of the distance or time remaining until target encounter which is divorced from the absolute amplitude of the received signal. Such a system would preferably provide a relatively small amplitude voltage variation proportional to the time remaining until target encounter.

One system proposed by others includes a counter and amplitude detector which are activated at some point during the projectile's trajectory. The counter counts pulses received from the start of measurement until the detector detects a doubling in the received amplitude of the signal. The time of amplitude doubling is estimated to be halfway point to the target at which time the counter is reversed and counts down until target encounter, at which point the terminal function is provided. Practical difficulties arise in such a system since the range law is never ideally reproduced in flight. Further, changes in the range law after the halfway point remain uncompensated in such a system which is therefore prone to inaccuracies.

SUMMARY OF THE INVENTION

It is therefore a primary object of the present invention to provide in a fuzing system a continuous readout of the current estimate of the time remaining until target encounter which is continuously and accurately updated throughout the projectile's trajectory.

A further object of the present invention is to provide a fuze system which incorporates an electronic apparatus mounted on a moving projectile for determining the time remaining until the projectile encounters a target, which output function is essentially independent of the absolute amplitude of the target-reflected signal.

An additional object of the present invention is to provide in a fuzing system an electronic apparatus which provides an output function indicative of the time remaining until target encounter which takes into account variations in the received signal caused by varying target aspect, vehicle attitude, flight path curvature, and the like.

A still further object of the present invention is to provide an electronic apparatus mounted on a moving projectile for determining the time remaining until the projectile encounters a target which is simple in its operation and relatively inexpensive to manufacture.

The foregoing and other objects are attained in accordance with one aspect of the present invention through the provision of an electronic apparatus mounted on a moving projectile for determining the time remaining until the projectile encounters a target, the projectile including means for receiving a signal reflected from the target. The apparatus comprises means for delaying the received signal for a predetermined time interval, variable attenuator means for attenuating the received signal according to the magnitude of a voltage control signal, and a differential amplifier having as its two inputs the respective outputs from the delay means and the variable attenuator means which produces as its output the voltage control signal indicative of the time remaining until target encounter. The inverting input to the differential amplifier is provided by the delay means, while the non-inverting input is provided by the output of the variable attenuator means. An integrator is preferably provided to smooth the output of the differential amplifier.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a curve representing a segment of an idealized approach signal received by a moving projectile fuze system for the classical range law;

FIG. 2 is a block diagram of the preferred embodiment of the electronic apparatus of the present invention; and FIG. 3 is a schematic illustration of a projectile and its associated target in accordance with the present invention.

DETAILED DESCRIPTION OF THE PREFERRED EMBODIMENT

Referring first to FIG. 3, a projectile 24 is schematically illustrated during flight and heading towards target 30. Projectile 24, which may comprise any of a number of well-known artillery components, includes electronic circuitry 26 and associated antenna 28, preferably placed in the nose portion of projectile 24, for transmitting and receiving signals reflected from target 30. Electronic circuitry 26, which includes the computing components of the present invention to be described in more detail hereinafter, normally includes power supply, timing, and proximity circuitry as is well known to a person of ordinary skill in the art.

In order to describe the principle of operation of the apparatus of the present invention, an ideal case will be assumed wherein the approach to the target (or of the target) is at a constant velocity, and the pure 1/d range law is operative, which yields a signal amplitude which is at every point inversely proportional to the remaining distance to the target. The curve depicted in FIG. 1 represents this idealized approach signal $i$ reflected from the target. The abscissa represents time remaining until encounter, while the ordinate represents the amplitude envelope of the received signal. Assuming a constant approach velocity, the time $n\tau$ remaining until encounter corresponds to target distance, and the slope, represented by the ratio $$\sigma = \frac{\frac{E}{(n+1)\tau}}{\frac{E}{n\tau}} = \frac{n\tau}{(n+1)\tau} = \frac{n}{n+1} \quad (1)$$

is characteristic of the time $n\tau$ remaining until encounter. $\tau$ represents an arbitrary time dimension, while $n$ represents an arbitrary time interval such that the abscissa of FIG. 1 displays ten evenly spaced time intervals as the projectile approaches the target. E represents an arbitrary amplitude dimension of the received signal. According to equation (1) and taking as an example the time interval between $n\tau = 6$ and $n\tau = 5$, the slope $\sigma$ is seen to be equal to 5/6 which uniquely represents given time interval for the idealized approach signal and accordingly provides a unique indication of the time remaining until target encounter. Thus, it is seen that during each time interval depicted in FIG. 1 there is a corresponding unique slope of the idealized approach signal that uniquely defines the time remaining until target encounter.

Referring now to FIG. 2, there is shown a block diagram of the essential components of the system according to the present invention. The input signal $i$ is applied to a differential amplifier 14 having a gain of A through two separate paths. One path is through a delay network 10 having a predetermined delay characteristic $\tau$. The output of delay network 10 is applied to the inverting input of amplifier 14 via line 16. The other path of the input signal $i$ to the amplifier 14 is through a voltage controlled attenuator 12 having an attenuation ratio $\alpha$ which is variable according to the magnitude of a control voltage $e_c$ applied along line 20. The output of the voltage controlled attenuator 12 is fed to the non-inverting input of amplifier 14 via line 18. The output of the amplifier 14 is the amplified difference $e_c$ between the two input signals received along lines 16 and 18 and is applied to the attenuator 12 as a control voltage such that attenuation is increased with increasing voltage. Accordingly, as time progresses the input difference to amplifier 14 will be decreased such that if the amplification A is very large, the two inputs to the amplifier 14 will be held very nearly equal.

During the ideal approach of the projectile to the target as depicted in FIG. 1, the input signal $i$ will increase with time according to the range law so that the signal along line 16 at the output of delay network 10 will be smaller than the signal at the input to delay network 10 by the ratio $\sigma$ which, from equation (1), uniquely defines the time remaining until encounter. Through the self-adjusting action of the system, the attenuation ratio $\alpha$ is set to very nearly equal the ratio $\sigma$. Because the ratio $\alpha$ corresponds to a specific control voltage $e_c$, the latter will be a known analog of the time remaining until encounter. The known analog is the control voltage function of the attenuator, calibrated in terms of the time remaining $n\tau$ until encounter.

In order to show that $e_c$ is indicative of the time remaining until encounter, it is necessary and sufficient to show that the system of FIG. 2 sets $\alpha$ approximately equal to $\sigma$. Assuming an attenuator control-voltage function such that $\alpha = 1/e_c$, then from FIG. 2, since $e_c = A(i\alpha - i\sigma)$, $$\alpha = \frac{1}{A(i\alpha - i\sigma)} = \frac{1}{Ai(\alpha - \sigma)}$$

so that
$$Ai\alpha^2 - Ai\sigma\alpha - 1 = 0 \quad (2)$$

from which $$\alpha = \frac{Ai\sigma \pm \sqrt{(Ai\sigma)^2 + 4Ai}}{2Ai}$$

$$\alpha = \frac{\sigma \pm \sqrt{\sigma^2 4/Ai}}{2} \quad (3)$$

Amplification, a system constant, can be made very much larger than $4/i$. Thus, $4/i$ may be neglected, yielding $$\alpha \approx \sigma \quad (4)$$

The other root of equation (2) represents the reversed, or regenerative connection to the inputs of the amplifier, and accordingly may be ignored for the present purposes.

Accordingly, it is seen that in this ideal case the ratio of the signal increase during a selected time interval is uniquely representative of the fraction of the remaining distance to the target traversed during the interval and thus of the remaining distance to the target. In the system of FIG. 2, the attenuator 12 is automatically and continuously adjusted to effect an equality between the signal amplitudes at the beginning and end of a selected running interval. Accordingly, the resulting attenuation $\alpha$ equals the ratio or slope $\sigma$ which then uniquely represents the distance remaining until encounter. The attenuator control voltage $e_c$ developed in the process then uniquely represents the distance until encounter, and may be output as a running analog of such distance, or of the time remaining to encounter assuming constant velocity.

In the ideal case, therefore, the system of my invention is substantially independent of the absolute amplitude of the input signal, the attenuator control voltage function, and of amplification, provided that A is much greater than $4/i$.

If the velocity of approach V is increased, say to 2V, then during an interval of time $\tau$, the signal will increase by $\sigma^2$, representing the increase which would be affected in a time interval $2\tau$ at the velocity V. The attenuator 12 then adjusts to $\alpha^2$, corresponding to $n/2\tau$, or one half the time remaining to encounter that would have been indicated at the velocity V. Accordingly, it is seen that the system represented by FIG. 2 automatically adjusts to velocity changes in the projectile.

Varying approach angles, target reflectances, and antenna pattern aspects cause fluctuations that appear as departures from the ideal, monotonic range law. In order to avoid false readings, it is usually necessary, and is extensively practiced, to insert an integrating network, such as integrator 22, which smooths these irregularities. Thus, the output function $e_o$ may be derived from $e_c$, the output of amplifier 14 through smoothing network 22 whose parameters are prudently chosen in relation to the selected delay $\tau$ for optimum performance in the specific application. The smoothing provided by integrator 22 will take care of updating due to a curved path, for example, which really represents a changing estimate of time.

It it seen that I have provided an electronic apparatus which offers a continuous function indicative of current time remaining until encounter with the target which is continuously updated throughout the trajectory of the projectile upon which it is mounted. The system as presented will work equally well with both CW and pulses. Obviously, numerous variations of the present invention are possible in light of the above teachings. For example, the delay and attenuation functions may be interchanged to provide a fixed slight attenuation and a variable delay.

Accordingly, I wish it to be understood that I do not desire to be limited to the exact details of construction shown and described, for obvious modifications may be made by a person skilled in the art.

What is claimed as new and desired to be secured by letters patent of the United States is:

1. Electronic apparatus mounted on a moving projectile for determining the time remaining until said projectile encounters a target, said projectile including means for receiving a signal reflected from said target, which comprises:

means for delaying said received signal for a predetermined time interval;

variable attenuator means for attenuating said received signal according to the magnitude of a control signal; and differential amplifier means having as its two inputs the respective outputs from said delaying means and said variable attenuator means for producing as its output said control signal;

whereby said control signal is indicative of the time remaining until said projectile encounters said target.

2. The electronic apparatus according to claim 1, further comprising integrating means connected to receive the output from said differential amplifier means for smoothing said output.

3. The electronic apparatus according to claim 1 wherein said two inputs to said differential amplifier means comprise an inverting input and a non-inverting input and wherein the output from said delaying means is applied to said inverting input and the output from said variable attenuator means is applied to said non-inverting input.

* * * * *